(12) United States Patent
Clodfelter

(10) Patent No.: US 8,140,217 B2
(45) Date of Patent: Mar. 20, 2012

(54) DAMAGE CONTROL SYSTEM AND METHOD FOR A VEHICLE-BASED SENSOR

(75) Inventor: James F. Clodfelter, Sterling, VA (US)

(73) Assignee: Niitek, Inc., Dulles, VA (US)

( * ) Notice: Subject to any disclaimer, the term of this patent is extended or adjusted under 35 U.S.C. 154(b) by 902 days.

(21) Appl. No.: 12/184,167

(22) Filed: Jul. 31, 2008

(65) Prior Publication Data

US 2009/0037049 A1 Feb. 5, 2009

Related U.S. Application Data

(60) Provisional application No. 60/962,777, filed on Jul. 31, 2007.

(51) Int. Cl.
*G06F 7/00* (2006.01)
(52) U.S. Cl. .......................................................... 701/36
(58) Field of Classification Search .................... 701/36; 73/856; 324/326; 280/727
See application file for complete search history.

(56) References Cited

U.S. PATENT DOCUMENTS

| | | | |
|---|---|---|---|
| 2,205,073 A | 6/1940 | Smit | |
| 2,303,744 A | 12/1942 | Jacobs | |
| 2,627,676 A | 2/1953 | Hack | |
| 2,720,714 A | 10/1955 | Flynn et al. | |
| 2,990,026 A | 6/1961 | Albee | |
| 3,061,951 A | 11/1962 | Barron | |
| 3,243,898 A | 4/1966 | Lewis, Jr. et al. | |
| 3,318,024 A | 5/1967 | Fujinaka et al. | |
| 3,516,181 A | 6/1970 | Jordan | |
| 3,626,804 A | 12/1971 | Paramythioti | |
| 3,733,721 A | 5/1973 | Clemens | |
| 3,771,413 A | 11/1973 | Sieg et al. | |
| 4,089,565 A | 5/1978 | Loegering et al. | |
| 4,098,011 A | 7/1978 | Bowerman et al. | |
| 4,135,188 A | 1/1979 | Bickley, Jr. et al. | |
| 4,194,310 A | 3/1980 | Bowerman | |
| 4,234,941 A | 11/1980 | Wellan, Jr. et al. | |
| 4,249,588 A | 2/1981 | Egan | |
| 4,378,643 A | 4/1983 | Johnson | |
| 4,489,405 A | 12/1984 | Tendler | |
| 4,525,941 A | 7/1985 | Ruth, Jr. | |
| 4,565,412 A | 1/1986 | Comminge et al. | |
| 4,590,123 A | 5/1986 | Hashimoto et al. | |
| 4,611,411 A | 9/1986 | Ringler et al. | |

(Continued)

FOREIGN PATENT DOCUMENTS

CA 2 234 597 10/1999

(Continued)

OTHER PUBLICATIONS

U.S. Appl. No. 11/634,793 from Aug. 17, 2010 to Dec. 14, 2010.

(Continued)

*Primary Examiner* — Faye M. Fleming
(74) *Attorney, Agent, or Firm* — Finnegan, Henderson, Farabow, Garrett & Dunner, LLP

(57) ABSTRACT

A damage control system for a vehicle-mounted sensor comprises at least one sensor frame. At least one sliding mechanism is coupled to the at least one sensor frame and configured to provide a path for the sensor frame to move forwards or backwards, or both. At least one height-adjustment mechanism is coupled to the sliding mechanism and configured to raise, lower, or both, the sensor frame.

27 Claims, 12 Drawing Sheets

U.S. PATENT DOCUMENTS

| | | | |
|---|---|---|---|
| 4,616,350 A | 10/1986 | Tendler | |
| 4,621,348 A | 11/1986 | Tendler | |
| 4,672,590 A | 6/1987 | Tendler | |
| 4,676,009 A | 6/1987 | Davis et al. | |
| 4,723,585 A | 2/1988 | Mechtel | |
| 4,773,298 A | 9/1988 | Tischer et al. | |
| 4,870,687 A | 9/1989 | DeLeon | |
| 4,909,128 A | 3/1990 | Grinwald | |
| 4,972,379 A | 11/1990 | Harris, Jr. | |
| 5,002,109 A | 3/1991 | Shepler et al. | |
| 5,007,325 A | 4/1991 | MacWatt | |
| D319,138 S | 8/1991 | Hart | |
| 5,176,765 A | 1/1993 | Yamaguchi et al. | |
| 5,189,243 A | 2/1993 | Hambric | |
| 5,198,608 A | 3/1993 | Cahill et al. | |
| 5,301,441 A | 4/1994 | Kownacki | |
| 5,327,139 A | 7/1994 | Johnson | |
| 5,351,734 A | 10/1994 | Mouri et al. | |
| 5,420,589 A | 5/1995 | Wells et al. | |
| 5,592,170 A | 1/1997 | Price et al. | |
| 5,631,835 A * | 5/1997 | Hagenbuch | 701/50 |
| 5,663,520 A | 9/1997 | Ladika et al. | |
| 5,711,139 A * | 1/1998 | Swanson | 56/10.2 R |
| 5,786,542 A | 7/1998 | Petrovich et al. | |
| 5,892,360 A | 4/1999 | Willer et al. | |
| 5,896,680 A | 4/1999 | Kim et al. | |
| 5,900,833 A | 5/1999 | Sunlin et al. | |
| 5,926,977 A | 7/1999 | Sanders | |
| 5,930,200 A | 7/1999 | Kabel | |
| 5,979,289 A | 11/1999 | French | |
| 5,979,290 A | 11/1999 | Simeone | |
| 5,988,037 A | 11/1999 | Haughom et al. | |
| 5,992,056 A | 11/1999 | Lohrmann | |
| 6,006,646 A | 12/1999 | Makris et al. | |
| 6,029,558 A | 2/2000 | Stevens et al. | |
| 6,082,024 A | 7/2000 | Del Biondi | |
| 6,094,157 A | 7/2000 | Cowdrick | |
| 6,115,945 A | 9/2000 | Ellis, III | |
| 6,128,999 A | 10/2000 | Sepp et al. | |
| 6,212,799 B1 | 4/2001 | Gingerich et al. | |
| 6,279,631 B1 | 8/2001 | Tuggle | |
| 6,297,449 B1 | 10/2001 | Dagtekin | |
| 6,333,631 B1 | 12/2001 | Das et al. | |
| 6,377,872 B1 | 4/2002 | Struckman | |
| 6,396,433 B1 | 5/2002 | Clodfelter | |
| 6,445,334 B1 | 9/2002 | Bradley et al. | |
| 6,478,387 B1 | 11/2002 | Rayman | |
| 6,505,421 B1 | 1/2003 | Vaz | |
| 6,636,581 B2 | 10/2003 | Sorenson | |
| 6,655,051 B1 | 12/2003 | Peche et al. | |
| 6,657,577 B1 | 12/2003 | Gregersen et al. | |
| 6,666,124 B2 | 12/2003 | Fleming | |
| 6,690,316 B2 | 2/2004 | Yankielun | |
| 6,725,572 B1 | 4/2004 | Krstic | |
| 6,751,892 B2 | 6/2004 | Chavet et al. | |
| 6,785,357 B2 | 8/2004 | Bernardi et al. | |
| 6,838,671 B2 | 1/2005 | Compana et al. | |
| 6,915,728 B2 | 7/2005 | Renwick et al. | |
| 6,952,990 B1 | 10/2005 | Clodfelter | |
| 7,042,385 B1 | 5/2006 | Wichmann | |
| 7,113,081 B1 * | 9/2006 | Reichow et al. | 340/440 |
| 7,190,302 B2 | 3/2007 | Biggs | |
| 7,467,810 B2 | 12/2008 | Leggatt | |
| 7,479,918 B2 | 1/2009 | Johnson et al. | |
| 7,486,768 B2 | 2/2009 | Allman et al. | |
| 7,511,654 B1 | 3/2009 | Goldman et al. | |
| 7,660,386 B2 | 2/2010 | Meng et al. | |
| 2002/0027521 A1 | 3/2002 | Clodfelter | |
| 2002/0175849 A1 | 11/2002 | Arndt et al. | |
| 2003/0172554 A1 | 9/2003 | Chavet et al. | |
| 2003/0193429 A1 | 10/2003 | Campana et al. | |
| 2003/0196543 A1 | 10/2003 | Moser et al. | |
| 2004/0251698 A1 * | 12/2004 | Welch et al. | 293/133 |
| 2005/0062639 A1 | 3/2005 | Biggs | |
| 2005/0128125 A1 | 6/2005 | Li et al. | |
| 2006/0050929 A1 | 3/2006 | Rast et al. | |
| 2006/0056584 A1 | 3/2006 | Allman et al. | |
| 2006/0130593 A1 * | 6/2006 | Richards et al. | 73/856 |
| 2006/0225900 A1 * | 10/2006 | Kimball | 172/311 |
| 2006/0267296 A1 * | 11/2006 | Dodd et al. | 280/5.512 |
| 2007/0260378 A1 | 11/2007 | Clodfelter | |

FOREIGN PATENT DOCUMENTS

| | | |
|---|---|---|
| DE | 38 41 303 | 6/1990 |
| JP | 6-74695 | 3/1994 |
| WO | WO 02/03007 | 1/2002 |

OTHER PUBLICATIONS

Office Action issued Jun. 10, 2009 in U.S. Appl. No. 11/977,582.
U.S. Appl. No. 11/634,793 as of Aug. 16, 2010.
U.S. Appl. No. 09/828,937 as of Aug. 16, 2010.
U.S. Appl. No. 10/244,007 as of Aug. 16, 2010.
U.S. Appl. No. 11/977,582 as of Aug. 16, 2010.
English language abstract of DE 38 41 303, published Jun. 13, 1990.
English language abstract of JP 6-74695, published Mar. 18, 1994.
Machine English language translation of JP 6-74695, published Mar. 18, 1994.
International Search Report issued in International Application No. PCT/US2008/71846, mailed Oct. 22, 2008.
Written Opinion issued in International Application No. PCT/US2008/71846, mailed Oct. 22, 2008.
Notice of Allowanced issued in related U.S. Appl. No. 11/977,582 on Nov. 16, 2009.

* cited by examiner

DAMAGE CONTROL SYSTEM AND METHOD FOR A VEHICLE-BASED SENSOR

TECHNICAL FIELD OF THE DISCLOSURE

The present disclosure is related to a vehicle-based sensor and, more particularly, to a damage control system for a vehicle-based sensor.

BRIEF DESCRIPTION OF THE DRAWINGS

Reference is made to the attached drawings, wherein elements having the same reference designations represent like elements throughout and wherein.

DETAILED DESCRIPTION OF SEVERAL EMBODIMENTS

Figure 1:
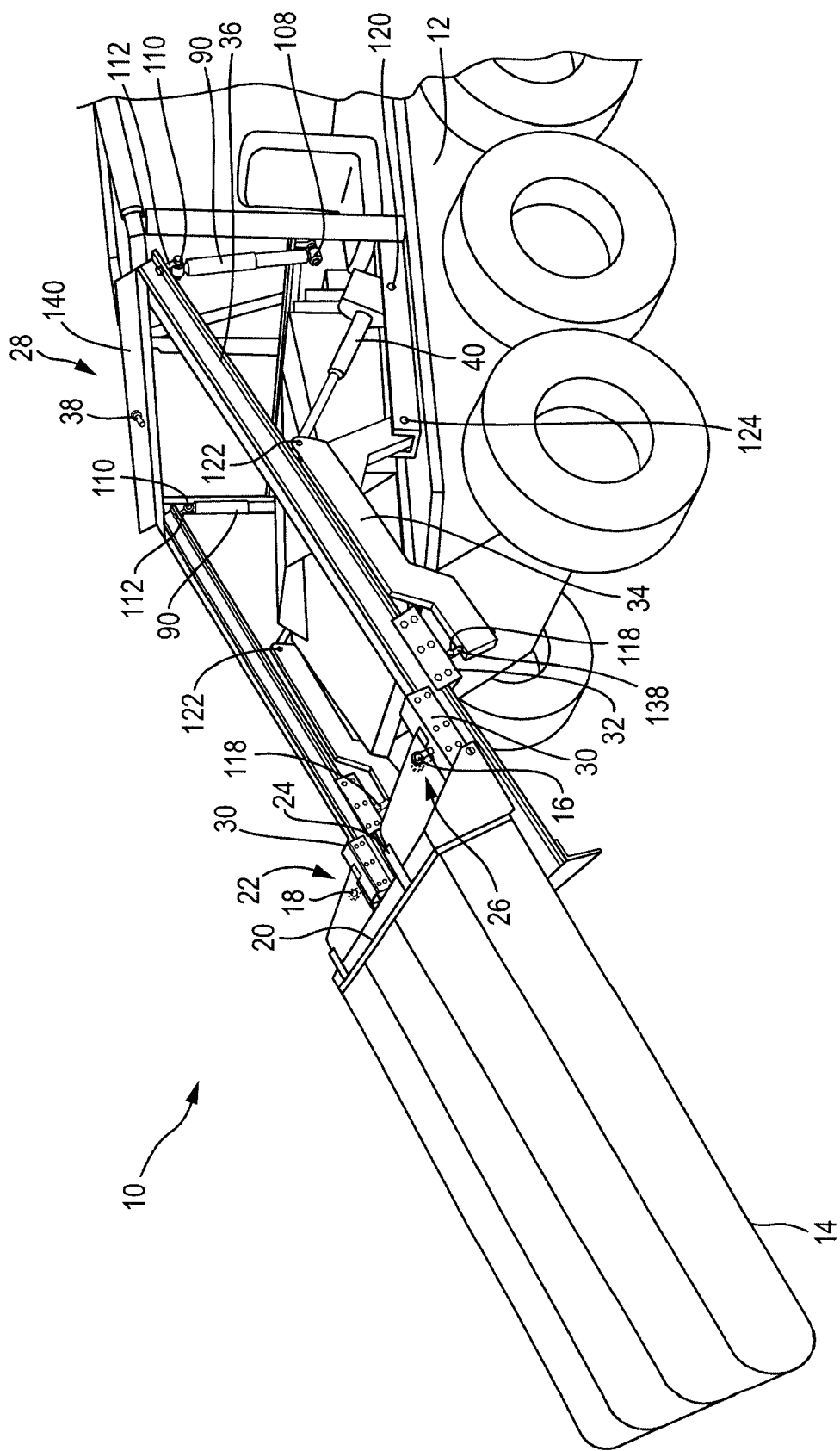
FIG. 1 is a perspective view of a damage control system for a vehicle-based sensor according to an embodiment.

FIG. 1 is a perspective view of a damage control system for a vehicle-based sensor according to an embodiment. Damage control system 10 is coupled to a vehicle 12. Vehicle 12 may include any work machine such as, for example, a tractor, an earth mover, a bulldozer, or any other such vehicle. In addition, vehicle 12 may include a specialty vehicle for mine clearance such a mine-resistant v-shaped hull with armor plating and/or shear away components to protect the occupant in a blast incident, or a passenger vehicle such as, for example, a truck, a jeep, a sports utility vehicle, or any other such passenger vehicle. The engine disposed in vehicle 12 may be a diesel engine, a gasoline engine, an electric engine, a hybrid engine or any other engine that can provide locomotive power to vehicle 12. Vehicle 12 may be manually operated, remotely controlled, or autonomously controlled.

Sensor 14 is mounted on damage control system 10. Specifically, in an embodiment, sensor 14 may be mounted on damage control system 10 in such a manner that sensor 14 may be in a 'deployed' position when sensor 14 is to be used and sensor 14 may be stowed away in a 'stow-away' position when sensor 14 is not in use. Damage-control system 10 may protect sensor 14 from any damage that may occur to sensor 14 while in use. In addition, damage control system 10 may also include components for automatic height control of sensor 14 during use of sensor 14. To this end, damage control system 10 includes a number of components for deployment, stow-away, automatic height control, and damage control of sensor 14.

In an embodiment, rails 36 may be made up of one or more I-beams or other liner guide and roller mechanisms. Furthermore, damage control system 10 may also include one or more shock absorbers 90. Shock absorber 90, as shown in FIG. 1, may connect to rail 36 on one end and vehicle 12 on the other end. Specifically, shock absorber 90 may connect via bolt 110 and rod 112 to rail 36 on the right side of sensor 14 as shown in FIG. 1. Shock absorber 90 may similarly connect to rail 36 at the left side of sensor 14. In addition, each shock absorber 90 may be connected to vehicle 12 by bolt 108. One skilled in the art will appreciate that multiple shock absorbers 90 may be similarly configured on vehicle 12 without departing from the scope of the disclosure. Shock absorbers 90 dampen high frequency vibrations while letting sensor 14 pivot left, right, up, and down. In particular, shock absorbers 90 remove the shake in that the damage control system 10 as would occur as vehicle 12 is driven over rough roads with potholes and roots and rocks. In an alternative embodiment, a rotational dampening mechanism may be placed at a spherical bearing or the rails 36 and their associated cross members including cross member 140 can be rigid enough to eliminate the need for shock absorber 90. In yet another alternative embodiment, two or more shock absorbers may be added to the front area of the sensor frame 20 and rails 36. Specifically, these shock absorbers may be attached to lift arm 34 and then to the front of vehicle 12. These shock absorbers may be primarily horizontal and they may dampen side-to-side shake and vibration. Alternatively, such shock absorbers 90 need not be provided at all. In yet another embodiment, the entire damage control assembly can be mounted more forward or less forward of vehicle 12. In some applications such as the one illustrated, damage control system 10 functions properly while mounted as shown because the front of the vehicle 12 is sloped or low enough. With other platforms, the front of vehicle 12 might be taller and more damage control would be permitted if the entire system 10 is shifted more forward or if the rails 36 are lengthened.

In an embodiment, one or more lift actuators 40 are pivotably connected to vehicle 12 by bolt 120 and pivotably connected to a lift arm 34 by bolt 122. Each lift arm is pivotably coupled to vehicle 12 by bolt 124. Each rail 36 is disposed above and parallel to each lift arm 34. Each lift arm 34 is coupled to a corresponding rail 36 by a lift arm skate 32. Lift arm skate 32 may also be known as a trolley or roller assembly or linear bearing. Lift arm 34 may be coupled to lift arm skate 32 via a pivot rod 138 and shaft 118. Lift arm 34 and lift actuator 40 may provide for height adjustment and/or damage control for sensor 14.

Cross member 140 connects rails 36. Spherical pivot 38 couples cross members 140 to vehicle 12, the details of which will be described later. Sensor 14 is connected to sensor frame 20. One or more sensor skates 30 may be slidably disposed on one or more rails 36. Sensor frame 20 connects sensor 14 to sensor pivot right 16 and sensor pivot left 18. In an embodiment, sensor pivot right 16 includes a spherical bearing connection between sensor frame 14 and sensor skate 30. Sensor pivot left 18 may be connected to sensor frame 14 and sensor skate 30. Sensor pivot right 16 and sensor pivot left 18 allow sensor frame 20 to pivot upwardly away from the parallel with rails 36, the details of which will be described later. Sensor pivot 18 may be spherical and permit yaw as well, i.e., damage relief if one corner of sensor 14 is struck. In an embodiment, sensor skate 30 may be attached to rail 36 by opposed rollers. Alternatively, any linear rail and linear bearing mechanism could be used without departing from the scope of the disclosure.

Sensor 14 includes equipment that can be used to detect landmines and/or perform subsurface visualization/detection for other objects or infrastructure. For example, sensor 14 may be used to detect concealed objects including, without limitation, hidden bombs, narcotics, cables, pipes, metallic objects, tunnels, containers, or corpses. Landmines include surface emplaced, buried, partially buried, manufactured, and improvised explosive devices and also the triggering devices that detonate them such as, for example, pressure plates. Sensor 14 may therefore be used to facilitate subsurface detection in various technology areas such as, for example, landmine detection, seeing through walls, archeology, law enforcement, construction, and geology. To this end, sensor 14 may include either one physical sensor or an array of physically distinct sensors that can perform the landmine detection and/or subsurface visualization/detection. Some sensors that may be mounted on vehicle 10 include: probes; metal detectors (e.g., wideband, narrow band, single point sources, and arrays); ground penetrating radars (e.g., frequency domain, time domain, ground coupled, air coupled, single point sources, and arrays); acoustic sensors where the ground is vibrated with sound waves and the ground's vibration is measured to detect unique ground vibrations near or over mines which therefore provides a method of detecting and locating mines (single point sources and arrays); seismic sensors, where the ground is vibrated, for example, by moving vehicles or other means, and the ground's vibration is measured to detect differences in the ground's vibration over mines which therefore locates the mines (single point sources and arrays); various spectral cameras (such as Infra-red and Ultra-violet or other multi-spectral cameras and combinations); chemical sensor "sniffer" technologies; harmonic radars which detect electronic activation devices, i.e., triggers; and nuclear Quadruple Resonance sensors. In addition, any other sensor that performs landmine detection and/or subsurface visualization/detection can be used as sensor 14 without departing from the scope of the disclosure.

Lift actuator 40 comprises any mechanism that lifts and that is capable of driving each rail 36. These lift mechanisms can be manual or computer controlled for automatic height adjustment. In an embodiment, lift actuator 40 may be an air actuator or a hydraulic actuator, or other lift mechanisms like a motorized cable assembly. Generally, there can be a duplicate right and left lift mechanism. Rail 36 provides a track for the sensor 14, sensor frame 20, and skate 30 to retract and/or move forward and reverse. In an embodiment, left and right rails 36 are identical. Alternatively, left and right rails 36 may be configured differently depending on the shape and purpose of the vehicle. For example, in an alternative embodiment, left rail 36 may be longer than right rail 36 or vice-versa.

Lift arm 34 connects lift actuator 40 to lift arm skate 32 which thereby raises and lowers rail 36. Furthermore, lift skate 32 slides backwards and forwards on rail 36 as lift arm 34 and lift actuator 40 raise and lower rail 36. In addition, spherical pivot 38 lets rails 36 and their associated cross members 140 move in yaw and roll about the spherical point. To this end, spherical pivot 38 may comprise a ball-socket joint.

In an embodiment, sensor skates 30 may serve at least four purposes. First, they may hold sensor 14. Second, they may permit sensor 14 to be deployed and stowed by sliding sensor 14 up and down rails 36. Third, they may provide damage control by allowing sensors 14 to slide up rails 36 during an impact. Fourth, they may enhance damage control because the left and right sides of sensor 14 may move independently. Sensor 14 may pivot to the right around sensor pivot right 16 and pivot to the left around sensor pivot left 18. Sensor pivot right 16 and sensor pivot left 18 will be described in more detail below. One of these connections may be a purely spherical bearing connection. The other may be a spherical bearing connection with an additional linear bearing connection to allow rails 36 to remain parallel if sensor 14 is cocked or rotated left-right or right-left.

While the components discussed above (e.g., sensor pivots 16 and 18, sensor skate 30, lift arm skate 32, lift arm 34, rails 36, and lift actuator 40) may be used to raise, lower, and pivot sensor 14, other lifting, sliding, and pivot mechanisms may be used to deploy, stow, and provide damage control to sensor 14 without departing from the scope of the disclosure. For example, sensor 14 could be suspended on cables so that sensor 14 swings upon impact or may be mounted on an articulating frame so that the articulating frame compresses like an accordion.

Figure 2:
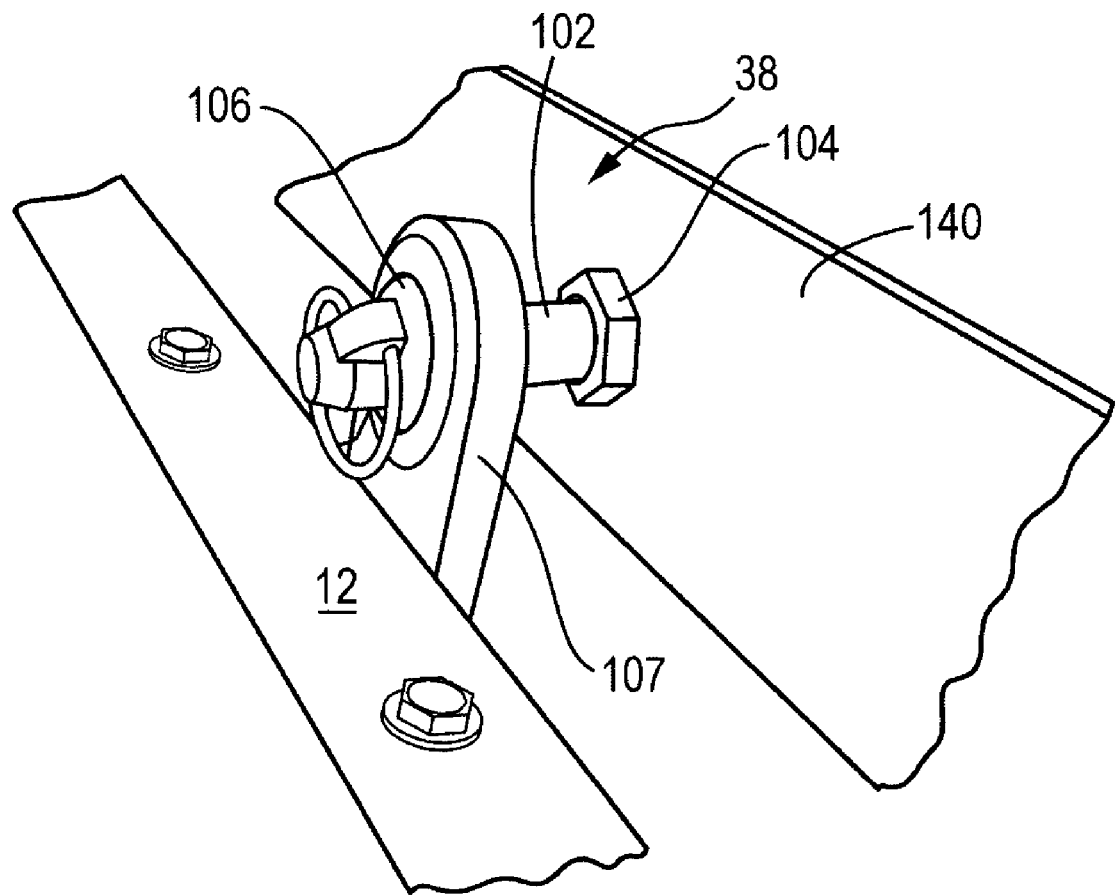
FIG. 2 is a perspective view of a spherical pivot used in the damage control system for a vehicle-based sensor according to an embodiment.

FIG. 2 is a perspective view of spherical pivot 38 as used in the damage control system for a vehicle-based sensor according to an embodiment. FIG. 2 displays spherical pivot 38 as seen from the opposite side of cross member 140 as compared to FIG. 1. Spherical pivot 38 may include a rod 102, a nut 104, a bearing 106, and a spherical socket 107. Spherical socket 107 may be coupled to vehicle 12. In addition, socket 107 may be configured to hold bearing 106. Bearing 106 may be coupled to rod 102. Rod 102 may coupled to cross member 140 via nut 104 and a corresponding nut on the opposite side of cross member 140. In an embodiment, rails 36 and their associated cross members 140 may move in yaw and roll about bearing 106. While the disclosed embodiment shows spherical pivot 38 configured as a ball-socket joint, any other configuration of spherical pivot 38 may be used to provide height adjustment and/or damage control for sensor 14 without departing from the scope of this disclosure.

Figure 3:
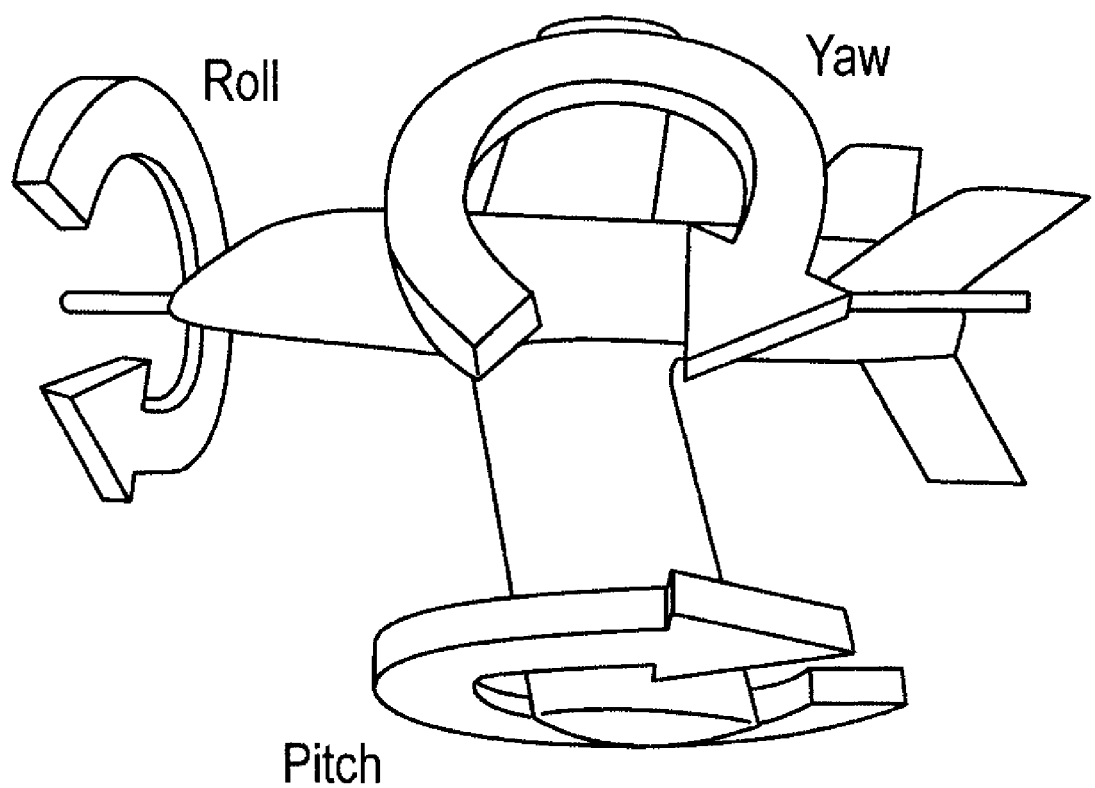
FIG. 3 is a schematic representation of the axes of rotation in which the disclosed sensor can rotate according to an embodiment.

FIG. 3 is a schematic representation of the axes of rotation in which sensor 14 can rotate according to an embodiment. As shown in FIG. 3, sensor 14 can rotate along three axes of rotation i.e., roll, pitch, and yaw. Thus, for example, spherical pivot 38 lets rails 36 and their associated cross members move in yaw and roll about the spherical point thereby causing sensor frame 20 that holds sensor 14 to move in yaw and pitch. Furthermore, sensor 14 may roll by pivoting around sensor pivot right 16 and/or sensor pivot left 18. Furthermore, sensor 14 may pitch about pivots 16 and 18 and may pivot like a wrist if, for example, sensor 14 impacts the ground.

Figure 4:
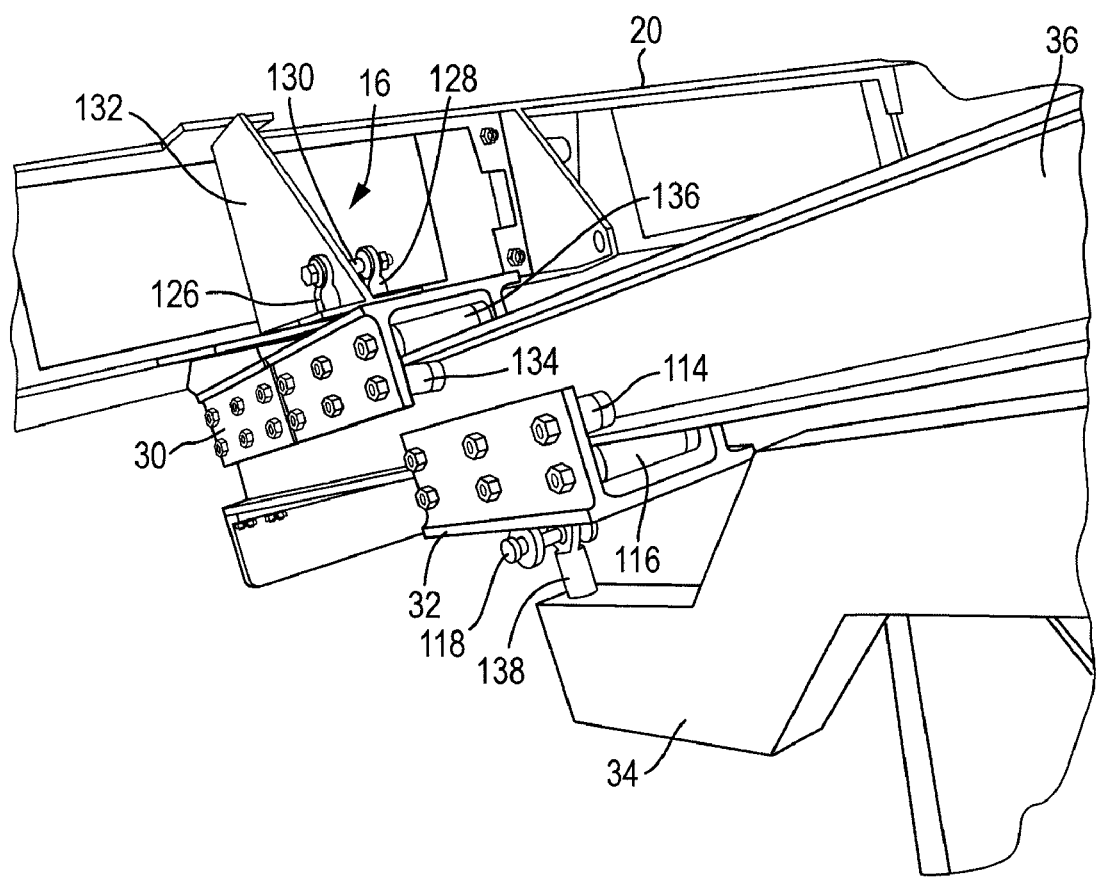
FIG. 4 is a perspective view of a sensor pivot used in the damage control system for a vehicle-based sensor according to an embodiment.
Figure 5:
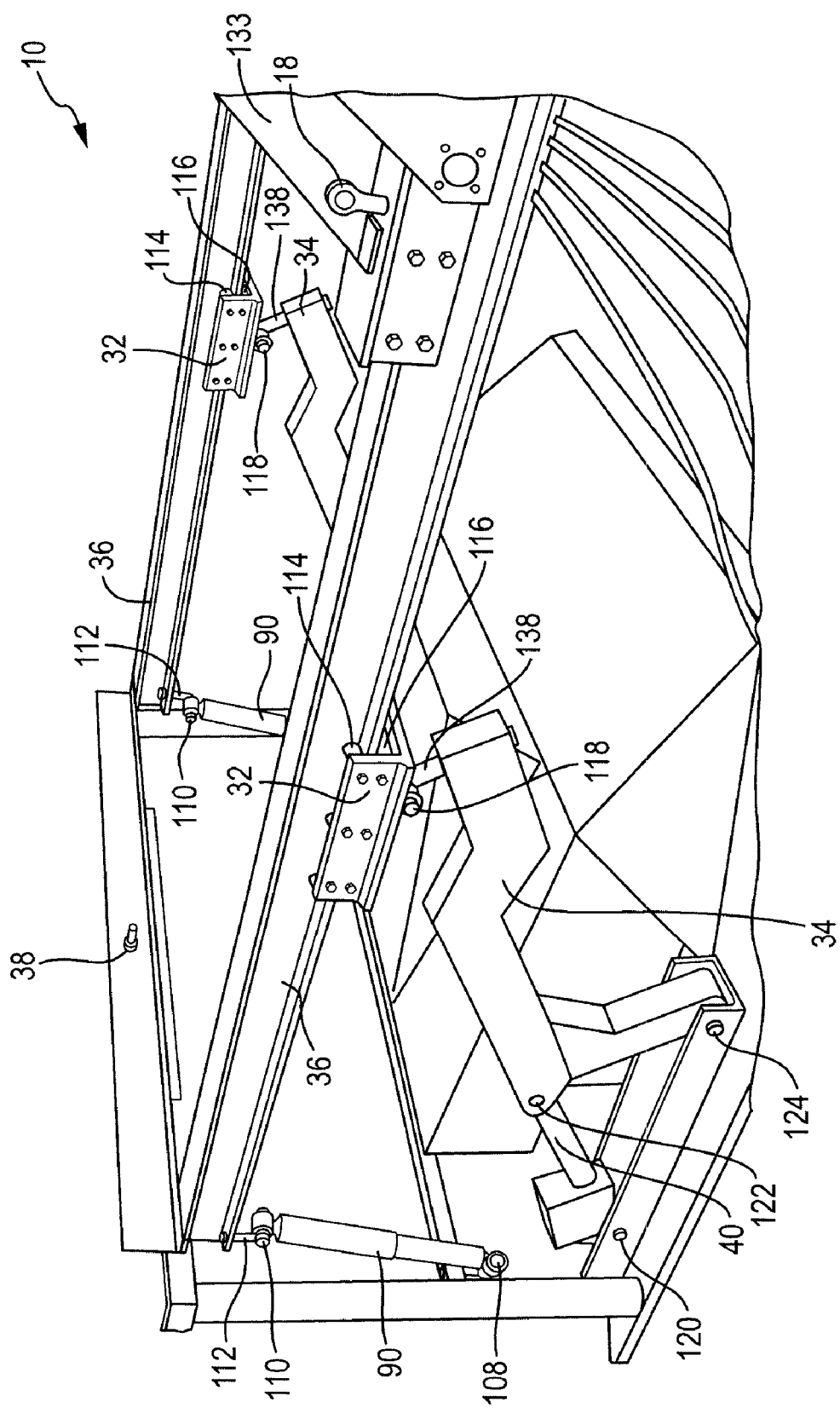
FIG. 5 is a perspective view of a damage control system for a vehicle-based sensor including a sensor pivot according to an embodiment.

FIGS. 4 and 5 are perspective views showing sensor pivot right 16, sensor pivot left 18, sensor skate 30, and lift arm skate 32 used in the damage control system for a vehicle-based sensor according to an embodiment. As mentioned above, damage control system 10 may include sensor frame 20 that may hold sensor 14 and connect sensor 14 to sensor pivot right 16 and sensor pivot left 18. Sensor 14 may pivot to the right around sensor pivot right 16 and pivot to the left around sensor pivot left 18. FIG. 4 provides a more detailed perspective view of how sensor pivot right 16 may be configured in an embodiment. Sensor pivot right 16 may include an outer pivot rod 126, an inner pivot rod 128, and a shaft 130. Outer pivot rod 126 and inner pivot rod 128 may be configured such that they hold shaft 130. Shaft 130 extends through flange 132 in sensor frame 20. By providing for a shaft 130 that extends horizontally through flange 132, sensor pivot 16 may allow sensor 14 to move sideways in addition to rotating around shaft 130. This sideways motion may let sensor skates 30 move independently up the rails 36 permitting yaw for sensor 14 thereby providing damage control in off-center impacts to sensor 14. This yaw motion may be accomplished in multiple ways without departing from the scope of this disclosure. Another way, for example may be to attach sensor 14 and vehicle to rails 36 by a central pivot mechanism as if sensor 14 was mounted to the forks of a bicycle head that was mounted to linear rails.

Figure 10:
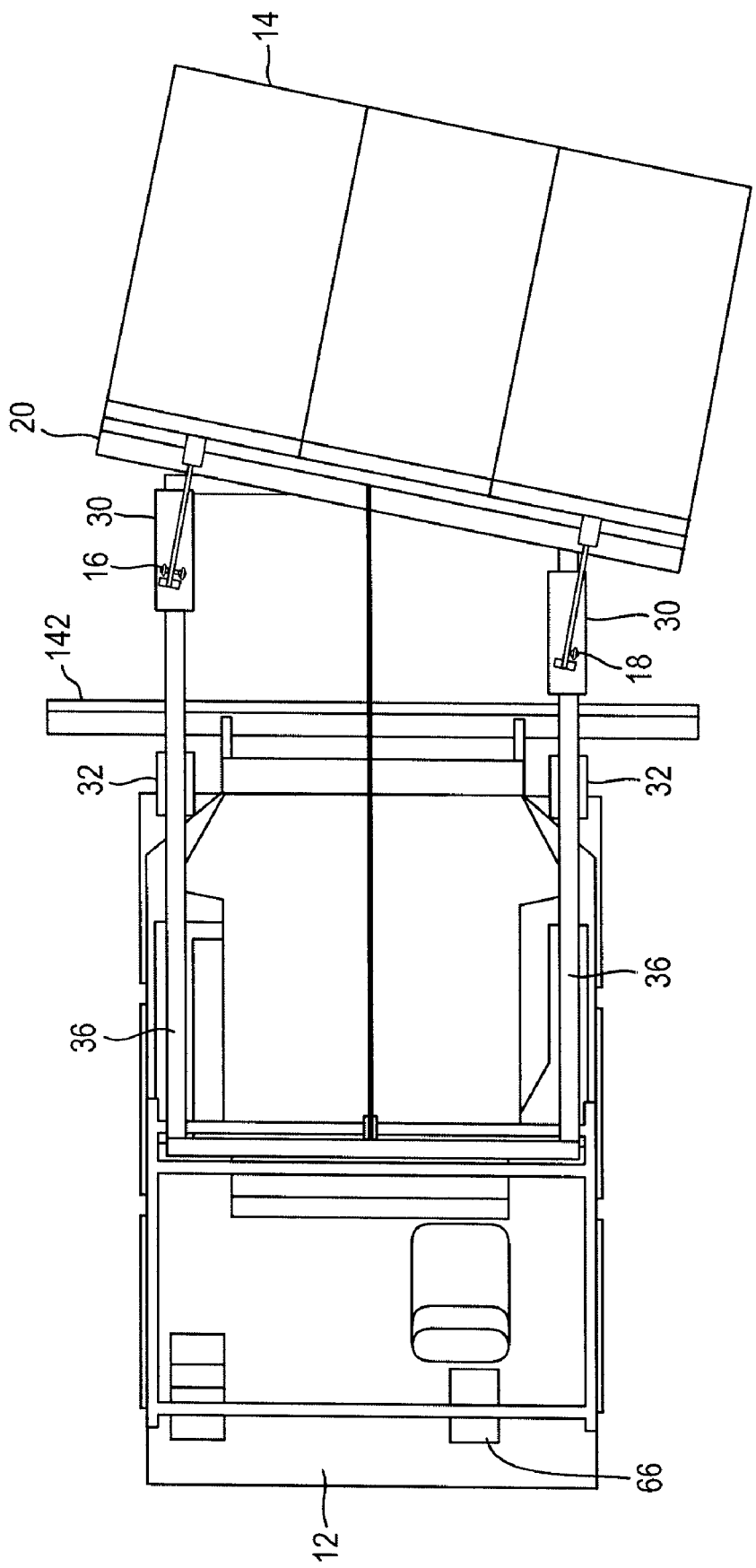
FIG. 10 is a top plan view of a vehicle-based sensor according to an embodiment.

In an embodiment, sensor pivot left 18 may not have a configuration identical to that of sensor pivot right 16. For example, as shown in FIG. 10, sensor pivot left 18 may only have a spherical pivot rod on the outer side of flange 133 in sensor frame 20. By having a sensor pivot right 16 having a configuration as shown in FIG. 4 and a sensor pivot left 18 as shown in FIG. 5, sensor 14 may rotate about either sensor pivot right 16 and/or sensor pivot left 18 with lateral movement of flange 132 along shaft 130 of sensor pivot 16 preventing binding. One skilled in the art will appreciate that the configuration of sensor pivot right 16 and sensor pivot left 18 may be reversed without departing from the scope of the disclosure. That is sensor pivot left 18 may have an inner pivot rod and outer pivot rod that hold a shaft that traverses through the inner and outer pivot rods and sensor pivot right 16 may include only one rod, and yet achieve the same functionality discussed above.

Returning to FIG. 4, sensor skate 30 and lift arm skate 32 are disposed on an I-beam that forms part of rail 36. Specifically, sensor skate 30 may be disposed on the upper portion of rail 36 and lift arm skate 36 may be disposed on the lower portion of rail 36. Furthermore, lift arm skate 32 may be configured to slide forwards and/or backwards on rail 36 with one or more lift arm skate top rollers 114 and one or more sensor skate bottom rollers 116. Also, lift arm skate 32 may be coupled to lift arm 34 through pivot rod 138 and shaft 118. In addition, other linear rail and slider mechanisms could be used.

Sensor skate 30 may be configured to slide forwards and/or backwards on rail 36 with one or more sensor skate lower rollers 134 and one or more sensor skate upper rollers 136. Furthermore, sensor skate 30 may include two separate physical skates as shown in FIG. 4. These separate skates may move independently of each other. In other embodiments though sensor skate 30 may be provided as one contiguous physical skate. In the disclosed embodiment, the sensor skates 30 and lift arm skates 32 are identical to reduce the number of unique parts. Though FIG. 4 only discloses one sensor skate 30 and lift arm skate 32 that are on the right side of sensor 14, another sensor skate 30 and lift arm skate 32 may be similarly configured on the left side of sensor 14.

Returning to FIG. 1, damage control system 10 also includes shear points 22, 26, and 28. Shear points 22, 26, and 28 may be located at various positions on vehicle 12 and may be configured to protect an operator of vehicle 12 from G forces during an explosion. For example, if a tire of vehicle 12 runs over a landmine, then the ensuing explosion may rapidly move vehicle 12 and the operator in vehicle 12 may be exposed to G forces which may break the operator's back, neck, or other parts of this body. However, with the presence of shear points 22, 26, and 28, the least wind-resistant portion of damage control system 10 may break away on explosion without the G forces being brought to bear upon the operator. Though not shown, these break away components may also be connected to vehicle 12 or other parts of damage control system 10 with safety cables to reduce forces but prevent the objects from becoming projectiles. In addition, or alternatively, the shear points may also be located at various points on vehicle 12 so that in event of an explosion, portions of vehicle 12 may break away reducing damage to vehicle 12 or damage control system 10. This sort of break-away and cable connection system may also prevent vehicle 12 components and damage control system 10 components from becoming projectiles that may damage the surroundings, vehicle operators, or other persons.

As shown in FIG. 1, shear points 22 and 26 are located at opposite ends of the sensor frame 20 and shear point 28 is located at the center of spherical pivot 38. However, one skilled in the art will appreciate that any number of shear points can be located at various positions of damage control system 10 without departing from the scope of the disclosure. In order to create a shear point on damage control system 10, the strength of fasteners around the shear point may be adjusted so that the fasteners may handle an appropriate factor of safety for a dynamic load but will otherwise shear in the event of an explosion. Shear points may be any number of types used in the art including but not limited to lower strength bolts and fasteners, friction fit fasteners, and adjustable friction-fit connections.

When lift arm skate 32, lift arm 34, and lift actuator 40 raise sensor frame 20 such that sensor 14 is above parallel, the gravitational force causes sensor skates 30 roll backwards along rails 36 so that sensor 14 slides back along rail 36. Conversely, when lift arm skate 32, lift arm 34, and lift actuator 40 lower sensor frame 20 such that sensor 14 is below parallel, the gravitational force causes sensor skates 30 to roll forwards along rails 36 so that sensor 14 slides forward along rail 36. This may create a gravitational stow and deploy feature.

Figure 6:
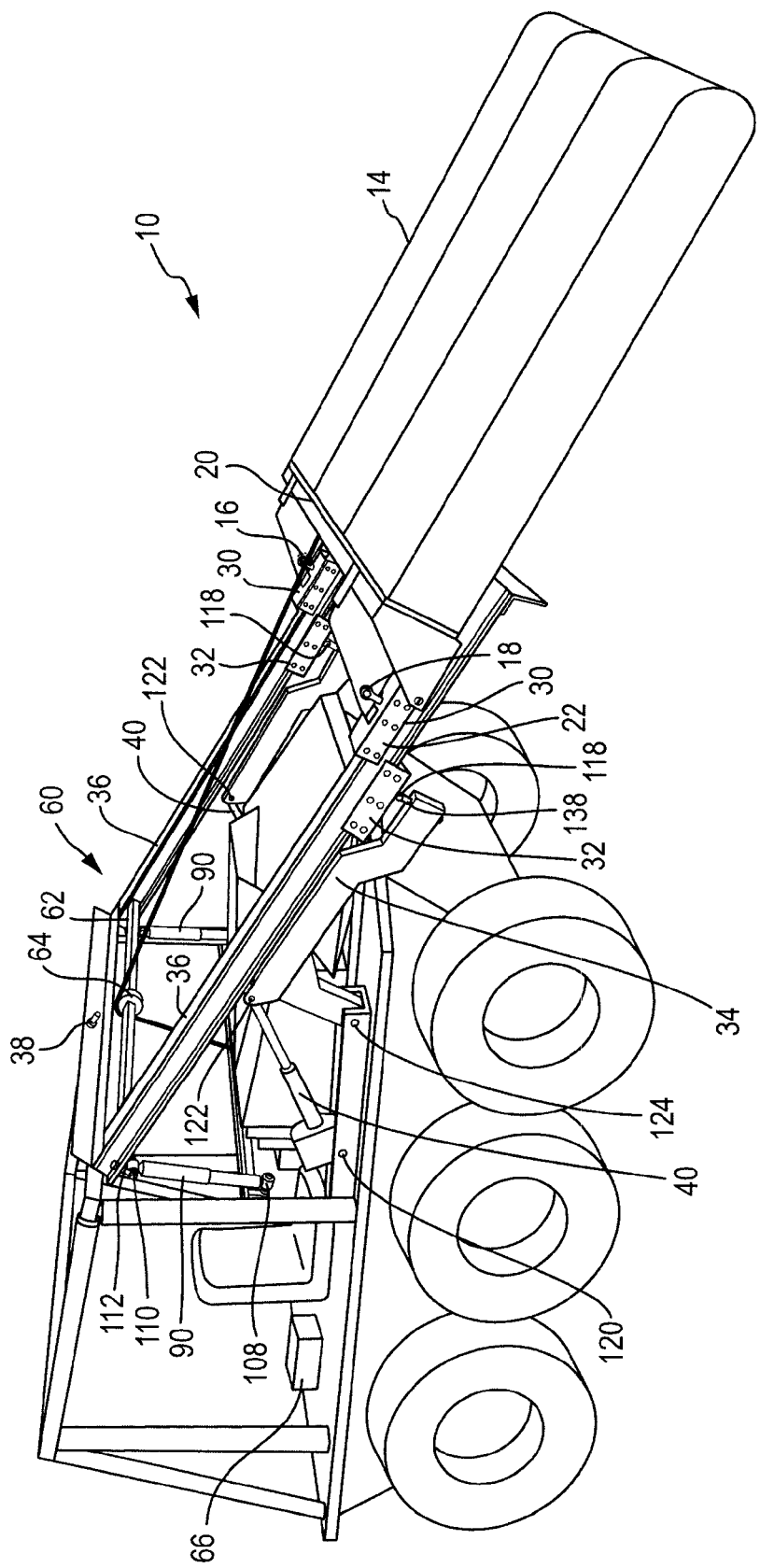
FIG. 6 is a perspective view of a damage control system for a vehicle-based sensor including a deployment, stow, and counterbalance mechanism according to an embodiment.

FIG. 6 is a perspective view of a damage control system for a vehicle-based sensor including deployment, stow, and counterbalance mechanisms according to an embodiment. Damage control system 10 includes components configured to adjust the height of sensor 14. These components may include, for example, lift arm skate 32, lift arm 34, and lift actuator 40, the details of which have been discussed above. While lift arm skate 32, lift arm 34, and lift actuator 40 may be used to raise and lower sensor 14, damage control system 10 may also include a mechanism to pull sensor 14 backwards along rails 36 to stow sensor 14. The same mechanism may also push sensor 14 along rails 36 to deploy sensor 14. These mechanisms may include, for example, an acme screw, a spring, an actuator, a rack and pinion arrangement, a motor-gear arrangement, or a pulley arrangement, or any combination of two or more thereof. In addition, any other mechanism that provides motion may be used to stow and deploy sensor 14. FIG. 6 discloses a pulley arrangement 60 that may be used to stow and deploy sensor 14 according to an embodiment. Pulley arrangement 60 includes a shaft 62 running across rails 36 and a pulley 64 disposed on the shaft. One or more cables run across pulley 64 and connect to sensor frame 20. A motor (not shown) may be used to move the one or more cables around pulley 64. In addition, the cable can include a linear spring or be connected to a torsional spring that counterbalances sensor 14 and therefore reduces the force required to slide sensor 14 up rails 36. This counterbalancing spring (not shown) may reduce the damage to sensor 14 and other components of damage control system 10 during impacts.

In addition, damage control system 10 may also include a controller enclosure 66 that includes a height controller in communication with the height adjustment mechanism discussed above to control the height adjustment mechanism to raise or lower sensor 14. Controller 66 may be configured to receive a signal from sensor 14 or other distance measuring sensors (not shown) such as laser measuring devices to control the height of the height adjustment mechanism. In an embodiment, controller 66 may include a CPU (central processing unit), one or more memory components such as, for example, RAM (random access memory), ROM (read only memory), and EEPROM (electrically erasable programmable read only memory), an input unit (e.g., keyboard, mouse, etc.), and an output unit (e.g., a monitor, printer, etc.) In addition, controller 66 may include other hardware components useable in adjusting the height of sensor 14. Controller 66 may also be configured to run on firmware, software or a combination of both to adjust the height of sensor 14. The software and/or firmware may be written in assembly language, C, C++, Pascal, JAVA, or any other programming language that may run on the hardware in controller 66. The hardware that constitutes controller 66 may be mounted on one physical chassis or instead may be distributed over multiple physical chassis. That is, the functionality of controller 66 may in an embodiment be performed in one physical unit, or in alternative embodiment be distributed over multiple physical units without departing from the scope of the disclosure. The CPU in controller 66 may not only provide for automatic height adjustment but may perform other functions as well. These other functions may include, for example, controlling a marking system, making real-time detections, determining and reporting the state of the health of systems and sub-systems on vehicle 12, applying the brake on vehicle 12 to stop before passing over a threat, transmitting images of a subsurface threat to another location, and controlling a robotic neutralization system that uses explosive chargers, chemical neutralizers, or a digging apparatus (not shown.)

As show in FIG. 6, lift actuators 40 extend in order to deploy sensor 14. In addition, pulley 64 rotates and the cable around pulley 64 sets sensor 14 down by letting sensor 14 slide downwards along rails 36. Alternatively, if an acme screw or a motor-gear arrangement is used, the acme screw or the motor-gear arrangement can be tuned to move sensor 14 along rails 36 and thus deploy sensor 14 without gravity and therefore independent of the length of lift actuators 40. On the other hand, in order to stow away sensor 14, using gravity lift actuators 40 contract. Without gravity, the acme screw is tightened or the motor-gear arrangement is operated in a manner to cause sensor 14 to retract along rails 36. In these embodiments, sensor 14 moves to a stowed position using gravity or motor driven power. If any of these motor driven deployment mechanisms are used, a release mechanism may be included to still allow for movement during an impact . . . .

In yet another embodiment, a spring mechanism may be used with sensor 14. Specifically, a torsion spring or a linear spring may be used to counterbalance sensor 14. Thus, when lift actuators 40 extend and lower rails 36, gravitational force pulls sensor 14 toward a deployed position. On the other hand, when lift actuators 40 contract to raise rails 36, the tension in the spring along with the weight of sensor 14 causes sensor 14 to retract on rails 36 and move to a stowed position.

Figure 7:
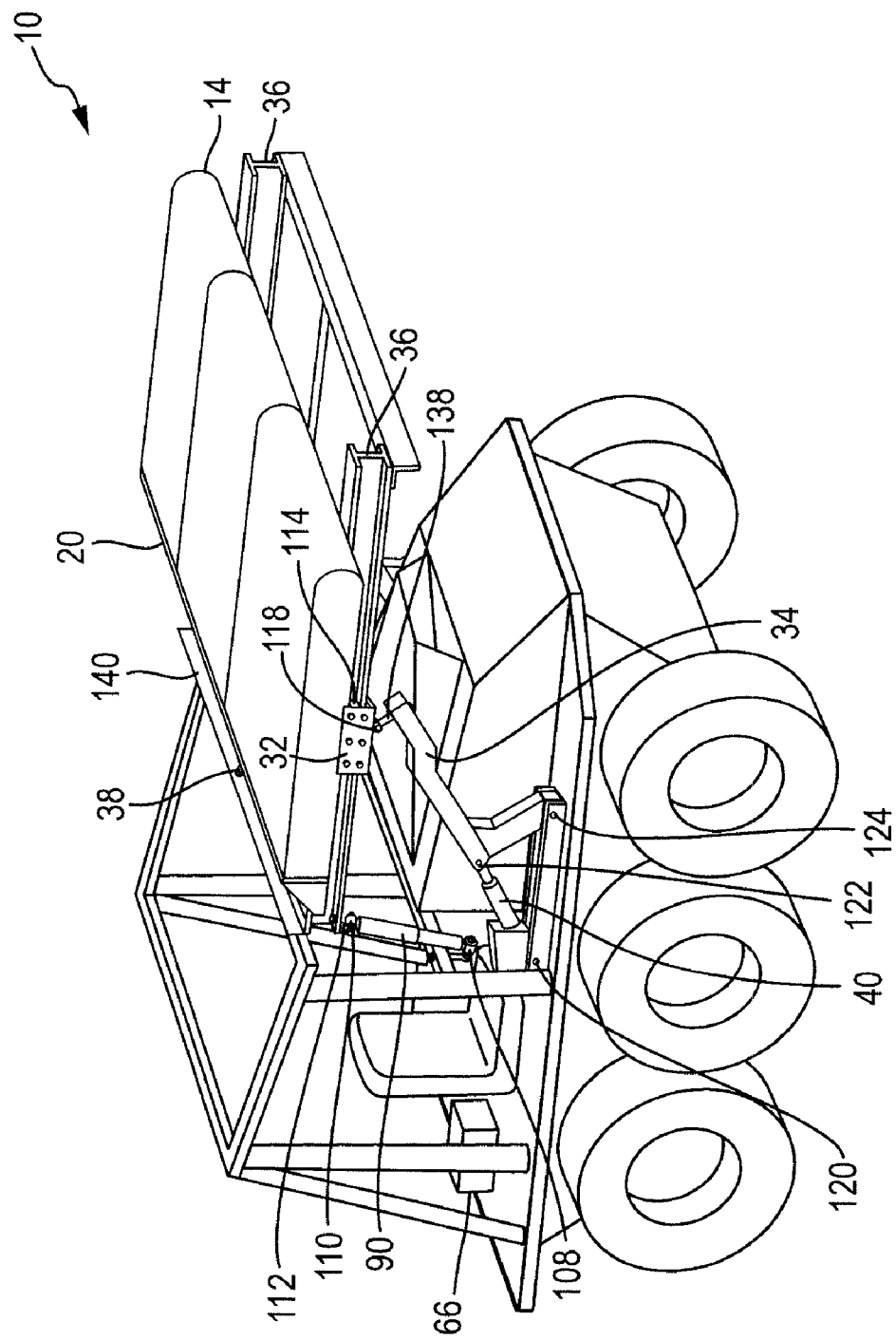
FIG. 7 is a perspective view of a damage control system for a vehicle-based sensor in which the sensor is in a stowed position according to an embodiment.

FIG. 7 is a perspective view of a damage control system for a vehicle-based sensor in which the sensor is in a stowed position according to an embodiment. As discussed above, upon extension of lift actuators 40, an acme screw, a spring, an actuator, a rack and pinion arrangement, a motor-gear arrangement, or a pulley arrangement, or any combination of two or more thereof causes sensor 14 to retract on rails 36 to be in a stowed position. While FIGS. 6 and 7 disclose damage control system 10 having sensor 14 in a deployed and stowed position, there may also be a need to raise sensor 14 without retracting sensor 14 to a stowed position. This need may arise, for example, when a "sky shot" function needs to be formed. In a sky shot function, sensor 14 is raised above parallel to the ground but sensor 14 should not retract into a stowed position. To achieve this position, an electronic solenoid (not shown) may lock sensor skates 30 to rail 36 by friction and actuator 40 may contract to the extent necessary to position sensor 14 as desired without retracting sensor 14 along rails 36.

A number of components may be used to lock sensor 14 once sensor 14 is in a deployed position to ensure that sensor 14 does not retract along rails 36 under any event. In an embodiment, one or more solenoids (not shown) may be used to lock sensor 14 once sensor 14 is in a deployed position. Specifically, the solenoids may be located on skates 30 (shown in FIG. 1) to lock sensor 14 in its deployed position. When the solenoids lock sensor 14, then even when the height-adjustment mechanism raises sensor 14, sensor 14 will not retract along rails 36 to a stowed position. On the other hand, in order to put sensor 14 in a stowed position, the solenoids may unlock sensor 14 so that sensor 14 may freely retract along rails 36. Once sensor 14 is in a stowed position, the solenoids may again lock sensor 14. For redeployment, the solenoids may unlock sensor 14 so that sensor may move along rails 36 to a deployed position. While this disclosure contemplates the use of solenoids to lock sensor 14, one skilled in the art will appreciate that other locking mechanisms may be used to lock sensor 14 into position. These may include, for example, magnets and solenoid actuated spring detents.

In an embodiment, sensor 14 senses the contours of the ground on which vehicle 12 moves. When sensor 14 detects uneven ground such as, for example, a raised portion of the ground, sensor 14 may send a signal to controller 66. Based on the received signal, controller 66 may send a signal to one or more components of the height-adjustment mechanism to adjust the height of sensor 14, i.e., the distance of sensor 14 from the ground. In an embodiment, controller 66 sends a signal to lift actuators 40 to contract, thus raising sensor 14. Similarly, if sensor 14 senses a mound on one side of vehicle 10, it may want to tip to the other side. In this case, sensor 14 may send a signal to controller 66 indicating the upcoming presence of the mound on a side of sensor 14. Upon receipt of this signal, controller 66 may send a signal to lift actuator 40 on that side causing the lift actuator 40 to contract and thus raising sensor 14 from that end in order avoid hitting the bump. One skilled in the art will appreciate that other such height adjustments can be made by controller 66 without departing from the scope of the disclosure.

Figure 8:
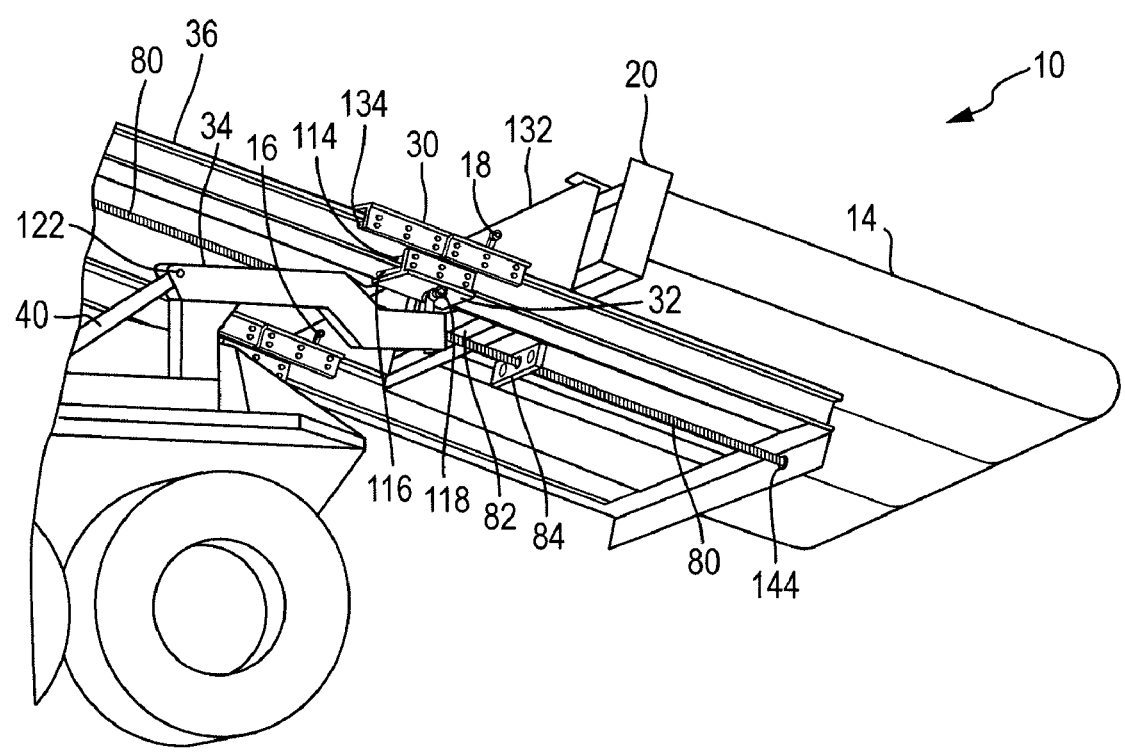
FIG. 8 is a perspective view of a deployment and bump-release mechanism for a vehicle-based sensor according to an embodiment.

FIG. 8 is a perspective view of a deployment and bump-release mechanism for a vehicle-based sensor according to an embodiment. Damage control system 10, in addition to the components described in FIG. 1, may also include an acme screw 80, a ferrous metal plate 82, and a magnetic plate 84. Because the functions of sensor 14, sensor frame 20, sensor skate 30, and lift arm 34 have already been described with respect to FIGS. 1, 2, and 4, in the interests of brevity, a repetition of that discussion is hereby omitted. Acme screw 80 is configured to move sensor 14 along rails 36. As discussed above, rotating acme screw 80 in one direction will extend sensor 14 along rails 36 to a deployed position whereas rotating acme screw 80 in the other direction will cause sensor 14 to retract. As shown in FIG. 8, acme screw is a threaded rod that fastens to magnetic plate 84 with a threaded nut that is to the right of magnetic plate 84 and, therefore, is hidden from the perspective view of FIG. 8. As acme screw 80 turns, the nut (hidden) moves up and down acme screw 80 and thereby moves magnetic plate 84 along the length of acme screw 80. In addition, the rightmost portion of acme screw 80 may be rotatably coupled to hole 144 thus allowing for the rotation of acme screw 80.

In an embodiment, acme screw 80 moves magnetic plate 84 linearly along the acme screw mechanism. In addition, ferrous metal plate 82 is fastened to sensor frame 20. When magnetic plate 84 comes near ferrous metal plate 82, they connect by magnetic force and can then be used to move sensor 14 up and down rails 36. In alternate embodiments, other grab and quick release mechanisms could be used as contemplated by the scope and spirit of the disclosure. These may include, for example, spring loaded rollers and detents, which will be discussed later. In other embodiments where springs (e.g., garage door spring mechanisms, or air spring mechanism, i.e. an air shock with variable pressure settings) are also used to counterbalance or spring load the mechanism in the stowed position, the magnets should beneficially be more forceful than the springs. When sensor 14 is subject to an impact such as, for example, from a bump, or vehicle 12 passing over a ditch, whose force is momentarily greater than the force of magnetic plate 84 minus the spring loading or counterbalancing, ferrous metal plate 82 releases from magnetic plate 84 and sensor 14 is allowed to slide up rails 36 when sensor skate 30 slides up along rails 36, while assisted by the spring loading or counterbalancing. The bump-release mechanism described above may thus prevent sensor 14 from snapping away from sensor frame 20 upon impact and may instead allow for sensor 14 to pivot and slide up on rails 36. This action may minimize any damage that may occur to sensor 14 from any impact.

Figure 9A:
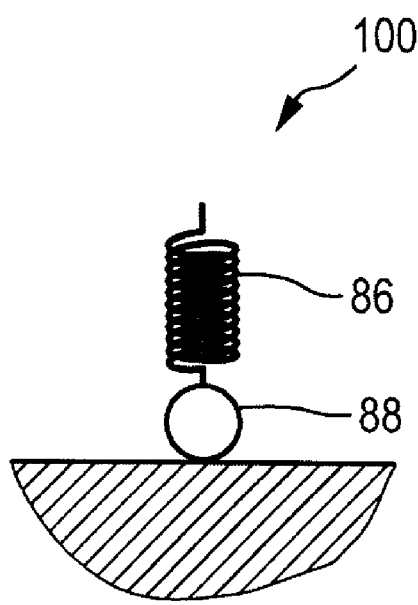
FIGS. 9A and 9B are schematic representations of a bump-release mechanism used in a vehicle-based sensor according to an alternative embodiment.
Figure 9B:
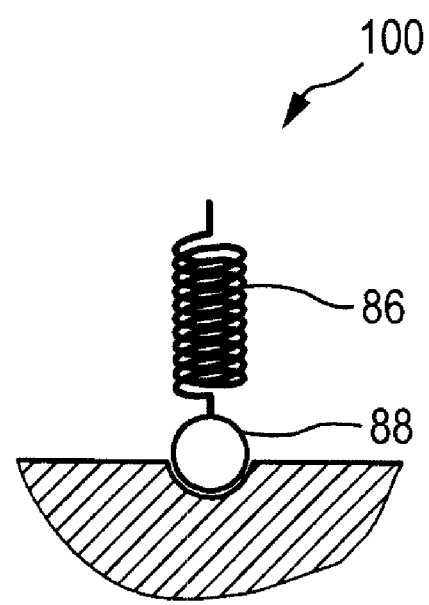

FIGS. 9A and 9B are schematic representations of a bump-release mechanism used in a vehicle-based sensor according to an alternative embodiment. As discussed above, instead of using magnets that magnetically connect to a ferrous plate, damage control system 10 may instead use a detent mechanism 100 as shown in FIGS. 9A and 9B. Detent mechanism 100 includes a spring 86 and a roller 88 coupled to spring 86. Detent mechanism 100 may be coupled to the damage-control system in a number of ways. In an embodiment, spring 86 may be disposed on at least a portion of sensor skate 30 (as shown in FIG. 1). Furthermore, roller 88 may roll along on at least a portion of the sliding mechanism such as, for example, rails 36. In order to deploy sensor 14, detent mechanism 100 may roll on rails 36 as shown in FIG. 9A as sensor skate 30 (as shown in FIG. 1) slides along rails 36. This sliding may occur until roller 88 slips into a slot on rails 36 that is configured to hold roller 88. This movement of the spring mechanism may be brought about by operation of an acme screw, a spring, an actuator, a rack and pinion arrangement, a motor-gear arrangement, or a pulley arrangement, or any combination of two or more thereof. In addition, any other mechanism that provides motion may be used to move sensor skate 30 along rails 36 may also be used to move roller 88 along rails 36. As shown in FIG. 9B, when roller 88 slips into the slot, sensor 14 is in the deployed position. At this time, detent mechanism 100 keeps sensor 14 in place in its deployed position by binding roller 88 into the slot.

When sensor 14 is subject to an impact such as, for example, from a bump, or vehicle 12 passing over a ditch, whose force is momentarily greater than the tension in spring 86 minus the spring loading or counterbalancing, roller 88 slips out of the slot and sensor 14 is allowed to slide up rails 36 while assisted by the spring loading or counterbalancing. The bump-release mechanism described above may thus prevent or reduce damage to sensor 14 or the damage control system 10 because the sensor 14 is allowed to move up on rails 36.

In an alternative embodiment, the configuration of detent mechanism 100 may be reversed. That is, spring 86 may be disposed on at least a portion of rails 36 and roller 88 may roll along at least a portion of sensor skate 30. Furthermore, when roller 88 slips into a slot on sensor skate 30 that is configured to hold roller 88, sensor 14 is in a deployed position. On the other hand, when sensor 14 is subject to an impact such that roller 88 slips out of the slot on sensor skate 30, sensor 14 is allowed to slide up rails 36 while assisted by the spring loading or counterbalancing.

Other types of binding mechanisms such as, for example, a ski-binding mechanism (not shown) may be used to bind sensor 14 into position upon deployment. In an embodiment, a ski-binding mechanism binds sensor 14 into a buckle configured to hold a strap that wraps around sensor 14. When sensor 14 is subject to an impact such as bump, whose force is momentarily greater than the tension in the strap that holds sensor 14, the strap slips out of the buckle and sensor 14 is allowed to slide up rails 36 while assisted by the spring loading or counterbalancing. This bump-release mechanism may also prevent sensor 14 from snapping away from sensor frame 20 upon impact and may instead allow for sensor 14 to pivot and slide up on rails 36. Other bump-release mechanisms may also be used to protect sensor 14 from impact without departing from the scope of the disclosure. In addition a similar detent mechanism may be employed to the pivot function around sensor pivot right 16 and sensor pivot left 18. Flange 132 can be influenced by a similar detent mechanism 100 that is mounted between flange 132 and sensor skate 30. This detent mechanism would prevent sensor 14 from "flapping" as vehicle 12 moves over uneven terrain. However if the "wrist flapping" momentum is great enough or if sensor 14 impacts the ground, the detent mechanism actuates and sensor 14 is permitted to pivot freely up around sensor pivot right 16 and sensor pivot left 18 therefore preventing damage to sensor 14 and damage control system 10.

Returning to FIGS. 1 and 8, in an embodiment, while rails 36 permit slide up damage control, sensor pivot right 16, a sensor pivot left 18, and spherical pivot 38 along with additional magnets may provide bump-up damage control. For example, if sensor 14 encounters a primarily vertical impact with the ground, and if that momentary impact is greater than the force of the magnets used or that of any other catch and release mechanism force (e.g., spring loaded roller, ski-binding, etc.) and gravitational force, then sensor 14 rotates and pitches upward about sensor pivot right 16 and/or a sensor pivot left 18.

FIG. 10 is a top plan view of a vehicle-based sensor as discussed with respect to FIG. 1, according to an embodiment. As discussed above, damage control system 10 includes sensor pivot right 16, sensor pivot left 18, sensor frame 20, sensor skate 30, lift arm skate 32, lift arm 34, rails 36, spherical pivot 38, and lift actuator 40. In addition, damage control system 10 may also include controller 66. The functions of these components have been discussed above. Therefore, in interests of brevity, a discussion of these components is omitted from this section of the Specification. Damage control system 10 or vehicle 12 may also include other components in addition to the ones shown in FIG. 10. For example, vehicle 12 may include marking system 142. Should sensor 14 identify an object of interest, such as a land mine, sensor 14 may send a signal to controller 66 which processes the sensor 14 signal to determine the location of the object of interest. Controller 66 then activates the appropriate valve on the marking system 142 to mark the location of the object of interest. In additional or alternatively, controller 66 could be connected to a global positioning system with inertial navigation (GPS/INS) and store or transmit the GPS location of the object of interest. The location would be stored on computer storage media such as a hard disk or random access memory.

FIG. 10 illustrates sensor 14 being impacted on the right corner. If the right corner impacts or is impacted by an object and if the momentary force combined with any spring or counterbalance force is great enough to overcome the magnetic force between ferrous metal plate 82 and magnetic plate 84 (see FIG. 8), then the connection between the magnetic plate 84 and the ferrous metal plate 82 is broken. Furthermore, as discussed with respect to FIG. 1, sensor 14 is coupled to sensor frame 20. Additionally, sensor frame 20 is coupled to sensor pivot right 16 by a combination of outer pivot rod 126, inner pivot rod 128, and shaft 130 (see FIG. 4). This combination is also coupled to sensor skate 30 (see FIG. 4). Upon breaking of the connection between the magnetic plate 84 and the ferrous metal plate 82, sensor skate 30 travels up rails 36 and damage to sensor 14 is minimized. Furthermore, if the force applied to the right corner is greater than a force applied to the left corner, a net rotational force will be applied to sensor 14. Sensor pivot left 18 is spherical permitting such rotation. Also, shaft 130 in sensor pivot right 16 allows right flange 132 of sensor frame 20 to travel along shaft 130 as sensor 14 rotates, minimizing damage to sensor 14.

In an embodiment where a spring loading or counterbalancing mechanism is used, sensor 14, sensor frame 20, and sensor skates 30 may be pulled up on rails 36 by the springs or counterbalance mechanisms. In addition, for re-deployment, the operator may operate stow and deployment mechanisms such as, for example, an acme screw, to move magnetic plate 84 up to ferrous metal plate 82 until they reconnect (see FIG. 8). While the discussion regarding FIG. 10 assumes that ferrous metal plate 82 and magnetic plate 84 are used to deploy and hold sensor 14, one skilled in the art appreciates that a damage control system that uses other bump-release mechanisms such as, for example, a spring loaded roller and detent mechanism 100 (as shown in FIGS. 9A and 9B) or a ski-binding-like mechanism, will operate similarly without departing from the scope of the disclosure.

Figure 11:
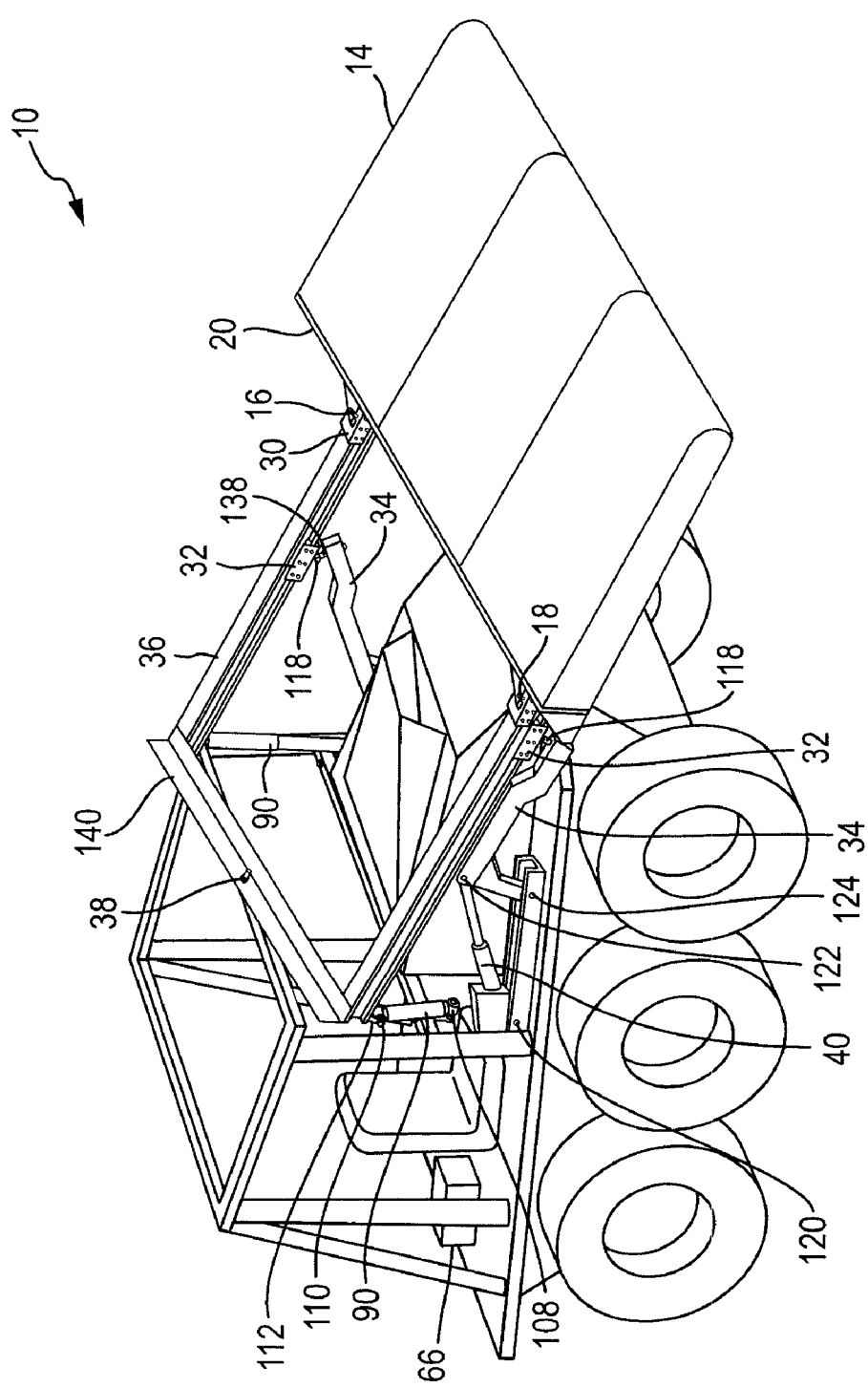
FIG. 11 is a perspective view of a vehicle-based sensor with the sensor tipped sideways according to an embodiment.

FIG. 11 is a perspective view of a vehicle-based sensor with the sensor tipped sideways according to an embodiment. Damage control system 11 includes components as discussed with respect to FIGS. 1, 2, and 4 above. For example, damage control system 10 includes sensor frame 20, shear point 28, lift arm 34, rails 36, spherical pivot 38, and controller 66. In addition, other components of the height adjustment mechanism, sliding mechanism, and pivot mechanism as discussed with respect to FIGS. 1, 2, and 4 may also be present in damage control system 10.

As shown in FIG. 11, sensor 14 is tipped up on the left. In an embodiment, to tip sensor 14 to the left, the lift actuator 40 on the left side contracts and lift arm 34 pivots about its pivot point 124. Also, as discussed above, lift arm 34 is coupled to the left lift arm skate 32. As lift arm skate 32 moves along left rail 36, the separation between the front of vehicle 12 and rail 36 is increased. This separation causes right rail 36 to rise. As right rail 36 rises, the entire assembly rolls about spherical pivot 38. In an embodiment, about twelve inches of left-right height variation may be sufficient for sensor 14 to tip to one side. One skilled in the art will appreciate that this tipping of sensor 14 to one side may be achieved manually, i.e., an operator manually operates the lifting mechanism to tip sensor 14, or automatically by controller 66 based on one or more signals received from sensor 14, or any combination thereof.

Figure 12:
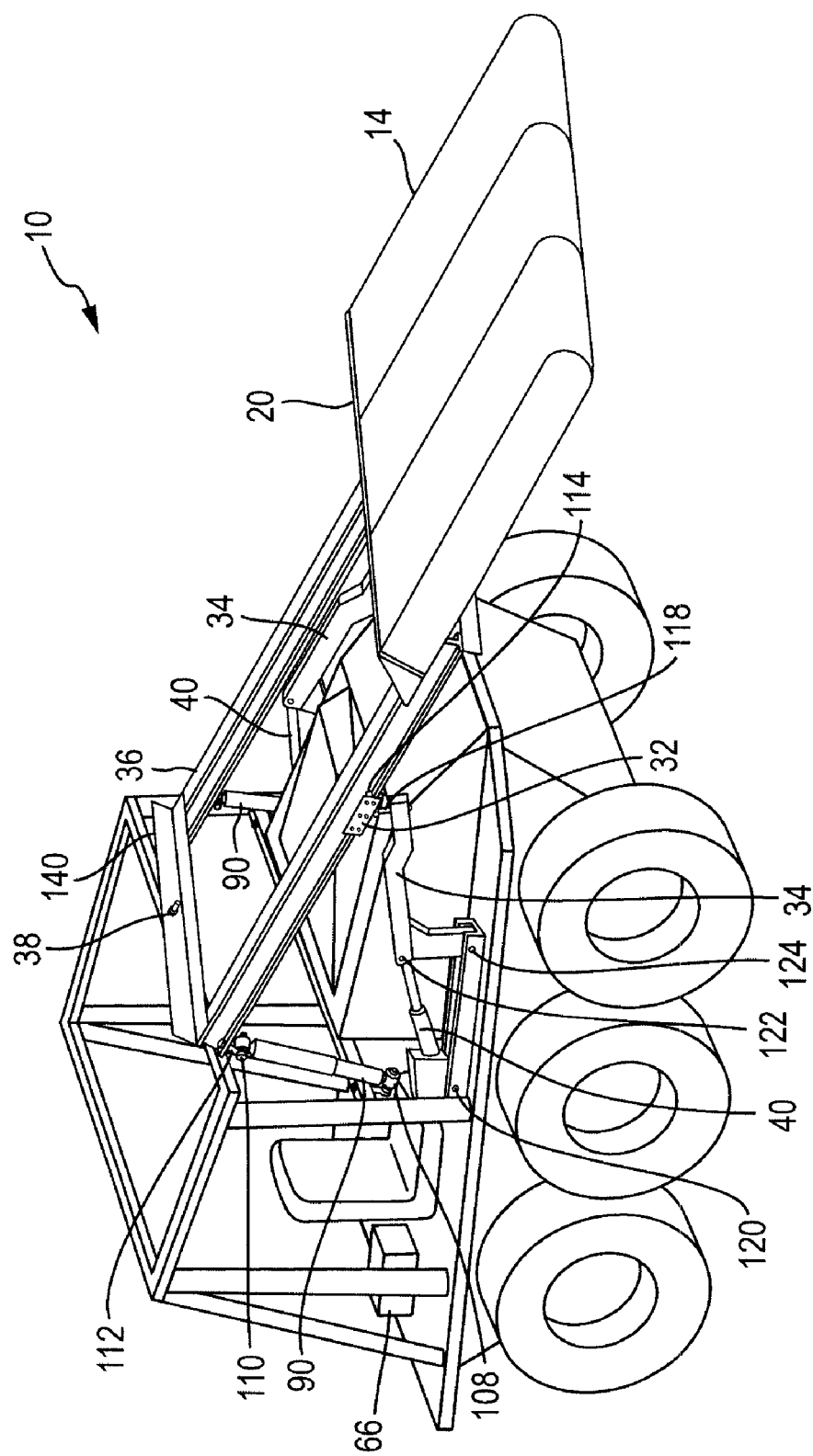
FIG. 12 is a perspective view of a vehicle-based sensor with the sensor tipped sideways according to an embodiment.

FIG. 12 is a perspective view of a vehicle-based sensor with the sensor tipped sideways according to an alternative embodiment. Damage control system 10 includes components as discussed with respect to FIGS. 1, 2, and 4 above. For example, damage control system 10 includes sensor frame 20, shear point 28, lift arm 34, rails 36, spherical pivot 38, and controller 66. In addition, other components of the height adjustment mechanism, sliding mechanism, and pivot mechanism as discussed with respect to FIGS. 1, 2, and 4 may also be present in damage control system 10.

As shown in FIG. 12, sensor 14 is tipped up on the right. To tip sensor 14 to the right, the lift actuator 40 on the right side contracts and lift arm 34 pivots about its pivot point 124. Lift arm 34 is attached to the right lift arm skate 32. As lift arm skate 32 moves along right rail 36, the separation between the front of vehicle 12 and rail 36 is increased. This separation causes left rail 36 to rise. As left rail 36 rises, the entire assembly rolls about spherical pivot 38 on the right. In an embodiment, about twelve inches of left-right height variation may be sufficient for sensor 14 to tip to one side. One skilled in the art will appreciate that this tipping of sensor 14 to one side may be achieved manually, i.e., an operator manually operates the lifting mechanism to tip sensor 14, or automatically by controller 66 based on one or more signals received from sensor 14, or any combination thereof.

Although the present disclosure has been described in connection with the illustrated embodiments, it will be appreciated and understood that modifications may be made without departing from the spirit and scope of the disclosure. For example, in an alternative embodiment, damage control system 10 may be coupled to the left side or right side of vehicle 12, thus allowing sensor 14 to scan to the left side or right side of vehicle 12 rather than only scanning what is in front of vehicle 12 as shown in FIG. 1. Alternatively, linear rail assemblies may be used to couple damage control system 10 horizontally across vehicle 12 permitting rails 36 to slide across vehicle 42. This may allow scanning of the side of the road while vehicle 12 remains on the road or while vehicle 12 remains in a pathway that was previously scanned and declared safe. In yet another alternative embodiment, linear active mounts may couple sensor 14 and sensor frame 20 to sensor pivot right 16 and sensor pivot left 18 via linear rails thus allowing for the shifting of sensor 14 from the center to the left or right side of vehicle 12 for off-center scanning.

What is claimed is:

1. A damage control system for a vehicle-mounted sensor comprising:
   at least one sensor frame configured to hold a vehicle-mounted sensor;
   at least one sliding mechanism coupled to the at least one sensor frame and configured to provide a path for the at least one sensor frame to move in at least one of a set of directions, the set of directions comprising: a forward direction and a backward direction; and
   at least one height-adjustment mechanism coupled to the sliding mechanism and configured to cause both the at least one sensor frame and the sliding mechanism to be in at least one of a set of states, the set of states comprising: a raised state and a lowered state.

2. The system of claim 1, further including at least one pivot mechanism coupled to the at least one sensor frame and configured such that the at least one sensor frame pivots in at least one of a set of pivot directions, the set of pivot directions comprising: an upward direction, a downward direction, and a sideways direction.

3. The system of claim 1, further including at least one pivot coupled to the at least one sliding mechanism and configured such that the at least one sensor frame pivots in at least one of a set of pivot directions, the set of pivot directions comprising: an upward direction, a downward direction, and a sideways direction.

4. The system of claim 1, wherein the at least one sliding mechanism includes at least one rail configured to provide at least one track for the at least one sensor frame to move in the at least one of the set of directions.

5. The system of claim 1, wherein the at least one height-adjustment mechanism comprises at least one of:

an acme screw, a spring, an actuator, a rack and pinion arrangement, a motor-gear arrangement, and a pulley arrangement.

6. The system of claim 2, wherein the at least one pivot mechanism includes at least one pivot point around which the at least one sensor frame pivots to one of a set of sides of the vehicle, the set of sides comprising: a left side and a right side.

7. The system of claim 1, further including at least one height controller in communication with the at least one height-adjustment mechanism, the height controller being configured to control the at least one height-adjustment mechanism to cause the at least one sensor frame to be in the at least one of the set of states.

8. The system of claim 1, wherein the at least one height controller is configured to receive a signal from the vehicle-mounted sensor to control the at least one height-adjustment mechanism.

9. The system of claim 1, further including a magnet coupled to the at least one sliding mechanism and a metal plate coupled to the at least one sensor frame, wherein the at least one sensor frame is configured to be deployed upon engagement of the magnet and the metal plate.

10. The system of claim 9, wherein the at least one sensor frame is configured to slide along the at least one sliding mechanism upon disengagement of the magnet and the metal plate.

11. The system of claim 1, further including at least one spring and roller mechanism coupled between the at least one sensor frame and the at least one sliding mechanism, wherein the vehicle-mounted sensor is deployed when the at least one spring and roller mechanism is locked into a slot, the slot being on one of a set of: the at least one sliding mechanism and the at least one sensor frame.

12. The system of claim 11, wherein the at least one sensor frame is configured to slide along the at least one sliding mechanism when the at least one spring and roller mechanism moves out of the slot.

13. The system of claim 1, further including at least one counterbalancing mechanism coupled to the at least one sensor frame and configured to counter balance a load of the vehicle-mounted sensor such that the at least one sensor frame slides along the path provided by the at least one sliding mechanism.

14. A method of moving a vehicle-mounted sensor, the method comprising:

receiving a force acting on a vehicle-mounted sensor; and sliding at least one sensor frame coupled to the vehicle-mounted sensor backwards along at least one rail upon the receipt of the force acting on the vehicle-mounted sensor.

15. The method of claims 14, further including lifting the at least one sensor frame upwards upon the receipt of the force acting on the vehicle-mounted sensor.

16. The method of claim 14, further including pivoting the at least one sensor frame around a pivoting mechanism upon the receipt of the force acting on the vehicle-mounted sensor.

17. The method of claim 14, wherein the at least one sensor frame is movable in at least one of a set of directions along the rail, the set of directions comprising: a forward direction and a backward direction.

18. The method of claim 15, wherein the lifting includes operating one of a set, the set comprising:

an acme screw, a spring, an actuator, a rack and pinion arrangement, a motor-gear arrangement, and a pulley arrangement.

19. The method of claim 14, further including causing the at least one sensor frame to be in at least one of a set of states based on at least one signal received from the vehicle-mounted sensor, the set of states comprising: a raised state and a lowered state.

20. A vehicle configured to carry a sensor suite, the vehicle comprising:

a chassis;

an engine operably coupled to the chassis;

at least one sensor frame configured to hold a vehicle-mounted sensor;

at least one sliding mechanism coupled to the at least one sensor frame and configured to provide a path for the at least one sensor frame to move in at least one of a set of directions, the set of directions comprising: a forward direction and a backward direction; and at least one height-adjustment mechanism coupled to the sliding mechanism and configured to cause both the at least one sensor frame and the sliding mechanism to be in at least one of a set of states, the set of states comprising: a raised state and a lowered state.

21. The vehicle of claim 20, further including at least one pivot mechanism coupled to the at least one sensor frame and configured such that the at least one sensor frame pivots in at least one of a set of pivot directions, the set of pivot directions comprising: an upward direction, a downward direction, and a sideways direction.

22. The vehicle of claim 20, wherein the at least one height-adjustment mechanism comprises at least one of:

an acme screw, a spring, an actuator, a rack and pinion arrangement, a motor-gear arrangement, and a pulley arrangement.

23. The vehicle of claim 21, wherein the at least one pivot mechanism includes at least one pivot point around which the at least one sensor frame pivots to one of a set of sides of the vehicle, the set of sides comprising: a left side and a right side.

24. The vehicle of claim 20, further including at least one height controller in communication with the at least one height-adjustment mechanism, the height controller being configured to control the at least one height-adjustment mechanism to cause the at least one sensor frame to be in the at least one of the set of states.

25. The vehicle of claim 20, further including at least one shear point, the shear point being located on the vehicle such that at least one portion of the vehicle shears away on impact.

26. The vehicle of claim 20, further including at least one shock absorber, the shock absorber being configured to reduce vibrations felt by the vehicle during operation of the vehicle.

27. The vehicle of claim 20, further including at least one counterbalancing mechanism coupled to the at least one sensor frame and configured to counter balance a load of the vehicle-mounted sensor such that the at least one sensor frame slides along the path provided by the at least one sliding mechanism.

* * * * *